United States Patent
Waldroup et al.

[11] Patent Number: 6,070,058
[45] Date of Patent: May 30, 2000

[54] SATURATION PREVENTION SYSTEM FOR RADIO TELEPHONE WITH OPEN AND CLOSED LOOP POWER CONTROL SYSTEMS

[75] Inventors: Anthony B. Waldroup, Suwanee, Ga.; Ryo Yamazaki, Arlington Heights, Ill.; He Feng Wang, Saitama, Japan

[73] Assignee: Oki Telecom, Inc., Suwanee, Ga.

[21] Appl. No.: 08/967,751

[22] Filed: Nov. 10, 1997

Related U.S. Application Data

[63] Continuation of application No. 08/434,650, May 4, 1995, Pat. No. 5,689,615.

[51] Int. Cl.$^7$ ............................... H04B 1/00; H04B 7/00
[52] U.S. Cl. ..................... 455/69; 455/67.1; 455/126; 455/127
[58] Field of Search ................................ 455/69, 70, 88, 455/89, 67.1, 126, 127, 226.2, 234.1, 234.2, 239, 245.1

[56] References Cited

U.S. PATENT DOCUMENTS

| | | | |
|---|---|---|---|
| 2,678,998 | 5/1954 | Young, Jr. | 250/6 |
| 2,924,703 | 2/1960 | Sichak et al. | 250/6 |
| 4,261,054 | 4/1981 | Scharla-Nielsen | 455/12 |
| 4,263,560 | 4/1981 | Ricker | 330/129 |
| 4,406,019 | 9/1983 | Ide et al. | 455/245 |
| 4,523,155 | 6/1985 | Walczak et al. | 330/279 |
| 4,560,949 | 12/1985 | Young | 330/284 |
| 4,602,218 | 7/1986 | Vilmur et al. | 330/279 |
| 4,633,316 | 12/1986 | Burke et al. | 455/260 |
| 4,636,741 | 1/1987 | Mitzlaff | 330/127 |
| 4,718,116 | 1/1988 | Jacobs et al. | 455/234.2 |
| 4,742,565 | 5/1988 | Iwahashi | 455/239.1 |
| 4,811,421 | 3/1989 | Havel et al. | 455/69 |
| 4,817,192 | 3/1989 | Phillips et al. | 455/200.1 |

(List continued on next page.)

FOREIGN PATENT DOCUMENTS

| | | |
|---|---|---|
| WO 91/07037 | 5/1991 | WIPO. |
| WO 92/21196 | 11/1992 | WIPO. |
| WO 93/07702 | 4/1993 | WIPO. |
| WO 95/23460 | 8/1995 | WIPO. |

OTHER PUBLICATIONS

CDMA Digital Cellular An ASIC Overview; Richard Kerr; Fall 1993; Applied Microwave & Wireless; pp. 30–41.

Schilling et al., Electronic Circuits Discrete & Integrated, 1989, pp. 2–6.

*Primary Examiner*—Reinhard J. Eisenzopf
*Assistant Examiner*—Sam Bhattacharya
*Attorney, Agent, or Firm*—Thomas, Kayden, Hostemeyer & Risley LLP

[57] ABSTRACT

An output power control system prevents saturation by limiting total output power and maintaining closed loop responsiveness for a radio telephone having closed loop and open loop gain control systems. The output power control system determines when total output power exceeds an output power trigger level and automatically enters a saturation prevention mode whereby total output power is reduced through modification of a closed loop power control register. In one embodiment, an output detector and an output comparator continuously monitor output power, and in another embodiment, an analog-to-digital converter samples output power levels. Saturation prevention processes of various preferred embodiments include, through continual monitoring, edge-triggered interrupt servicing, and level-triggered interrupt servicing, subsequently modifying the closed loop power control register to decrease the closed loop output power control portion of the total output power until the output power falls below the output trigger level. A saturation prevention method of yet another embodiment includes maintaining the closed loop power control register at a constant level unless a decrease in received signal strength is detected, in which case the closed loop power control register is modified to compensate for an increased open loop component of the total output power.

20 Claims, 12 Drawing Sheets

U.S. PATENT DOCUMENTS

| | | | |
|---|---|---|---|
| 4,817,197 | 3/1989 | Shimizu et al. | 455/314 |
| 4,958,359 | 9/1990 | Kato | 455/69 |
| 5,020,092 | 5/1991 | Phillips et al. | 379/59 |
| 5,020,093 | 5/1991 | Pireh | 379/59 |
| 5,056,109 | 10/1991 | Gilhousen | 375/1 |
| 5,093,840 | 3/1992 | Schilling | 375/1 |
| 5,099,204 | 3/1992 | Wheatley, III | 330/279 |
| 5,099,493 | 3/1992 | Zeger et al. | 375/1 |
| 5,103,459 | 4/1992 | Gilhousen et al. | 375/1 |
| 5,107,225 | 4/1992 | Wheatley, III et al. | 330/279 |
| 5,107,487 | 4/1992 | Vilmur et al. | 370/18 |
| 5,129,098 | 7/1992 | McGirr et al. | 455/69 |
| 5,267,262 | 11/1993 | Wheatley, III et al. | 375/1 |
| 5,278,992 | 1/1994 | Su et al. | 455/69 |
| 5,283,536 | 2/1994 | Wheatley, III et al. | 330/279 |
| 5,323,425 | 6/1994 | Colamonico et al. | 375/98 |
| 5,345,598 | 9/1994 | Dent | 455/54.1 |
| 5,396,516 | 3/1995 | Padovani et al. | 375/225 |
| 5,438,683 | 8/1995 | Durtler et al. | 455/126 |
| 5,467,055 | 11/1995 | Wray et al. | 455/126 |
| 5,524,287 | 6/1996 | Yokoya et al. | 455/69 |
| 5,542,111 | 7/1996 | Ivanov et al. | 455/126 |
| 5,590,409 | 12/1996 | Sawahashi et al. | 455/69 |
| 5,603,096 | 2/1997 | Gilhousen et al. | 455/69 |
| 5,689,815 | 11/1997 | Yamazaki et al. | 455/69 |

SATURATION PREVENTION SYSTEM FOR RADIO TELEPHONE WITH OPEN AND CLOSED LOOP POWER CONTROL SYSTEMS

This application is a continuation of application Ser. No. 08/434,650, filed on May 4, 1995, now U.S. Pat. No. 5,689,615.

BACKGROUND OF THE INVENTION

The present invention relates generally to the field of radio communication, and more specifically, to the field of output power control in code division multiple access (CDMA) cellular telephones.

Several industry standard publications currently direct design and operation of all types of CDMA cellular telephones, including portable mobile stations, handheld mobile stations, and mobile stations mounted in automobiles. These standards are considered to be understood by those reasonably skilled in the art of the present invention. Standard specifications relevant to the present invention include TIA/EIA/IS-95 Mobile Station-Base Station Compatibility Standard for Dual-Mode Wideband Spread Spectrum Cellular System, sections 6.1.1.1–6.1.2.4.2, and TIA/EIA/IS-98, Recommended Minimum Performance Standards for Dual-Mode Wideband Spread Spectrum Cellular Mobile Stations, sections 1.4, 10.4.4.1–10.5.2.3.

Precise mobile station power control is a very important requirement for proper and efficient operation of a CDMA cellular telephone system. During times when a mobile station is located far away from the nearest base station, the mobile station needs to transmit signals at maximum output power to maintain an optimum communication link. However, as a CDMA mobile station moves closer to a base station, the amount of mobile station output power necessary to continue communication is reduced. Furthermore, such a reduction in mobile station output power is necessary to reduce interference between mobile stations. Thus, in addition to preserving battery reserves, the use of as little mobile station output power as is necessary to maintain a strong communication link at all times is a requirement to ensure proper operation of a CDMA cellular telephone system.

According to the above-referenced standards, a CDMA mobile station shall provide two independent means for output power adjustment: open loop estimation, solely a mobile station operation, and closed loop correction, involving both the mobile station and the base station. An open loop gain control system detects the strength of the signal received from the base station and uses that value to inversely control the output power of the mobile station. Thus, according to the open loop gain control system, as the received signal strength increases (the mobile station nearing the base station), the amount of output power is decreased. A typical open loop gain control system includes a conventional automatic gain control system which detects received signal strength and uses that value to control an adjustable gain transmitter amplifier which accordingly varies the amount of gain applied to the radio transmission signal. Thus, the open loop gain control system is solely a mobile station operation based upon the strength of the signal received at the mobile station from the base station.

A closed loop gain control system, on the other hand, involves both the mobile station and the base station. In a closed loop gain control system, the base station detects the strength of the signal received from the mobile station and then accordingly instructs the mobile station to increase or decrease power. Thus, the mobile station continually analyzes control data from the base station (typically in the form of a single bit commanding either an increase or a decrease in power) to determine whether to increase or decrease output power. A closed loop gain control system is typically implemented using a closed loop power control register which is functionally connected to a pulse density modulator within a mobile station modem application-specific integrated circuit (MSM ASIC) to provide an analog output representation of the value stored in the register. This analog representation is then combined with output from the open loop gain control system to assist in controlling the adjustable transmitter amplifier. The register value and adjustable transmitter amplifier are also usually in an inverse relationship such that an increase in the register value (typically due to receiving a "1" from the base station) results in a decrease in overall power.

Achieving proper operation of an output power control system incorporating both open and closed loop gain control systems within a single mobile station can create special design challenges. In addition to the expected difficulties encountered when combining two such independent systems, other problems are created by additional requirements imposed by the above-referenced standards. Namely, there are limits on total power output and spurious emission levels, requirements for closed loop variations about the open loop estimate, and response time requirements for responding to instructions from the base station. First, using a handheld mobile station operating at full rate communication, the effective radiated power at maximum output power has an upper limit of 30 dBm and a lower limit of 23 dBm. Thus, when at maximum power, the mobile station must radiate at least 23 dBm but not more than 30 dBm. The actual value for effective radiated power at maximum output power is typically around 28 dBm because of the second requirement which limits maximum spurious emission levels. On the lower end of the total output power scale, the mobile station must have a mean controlled output power less than −50 dBm when the output power is set to minimum. Thus, according to industry standard specifications, the mobile station should ideally be able to output power throughout a range of −50 dBm to 30 dBm.

In addition to these requirements, the closed loop gain control system must have a range of at least 24 dB above and 24 dB below the open loop estimate. In other words, regardless of where the open loop estimate places the total output power along the −50 dBm to 30 dBm range, the closed loop gain control system is required to be able to increase or decrease the total output power by at least 24 dB upward or downward from that open loop estimate. In one implementation of the closed loop gain control system, the closed loop range is divided into equal steps represented by incremental memory values corresponding to one dB units of gain. Thus, as the base station instructs the mobile station to increase or decrease power, the closed loop gain control system attempts to increase or decrease, respectively, the total output power by one dB.

Clearly, these requirements related to total output power and closed loop gain control create the potential for conflict. In other words, if the open loop estimate is within 24 dB of the maximum output power (e.g., above 6 dBm in an ideal 30 dBm system), the potential exists for the closed loop system to enter into a saturated condition. For instance, if the mobile station is far from the base station, the base station may continue to instruct the mobile station to increase power even after the mobile station has reached its maximum output power. In such a situation, the closed loop system could be at least 24 steps above the maximum output ability of the mobile station so that it would take 24 consecutive decrease power instructions from the base station before the mobile station would begin to reduce actual output power. Unfortunately, this result is not acceptable in light of yet another requirement imposed by the above-referenced standard which dictates closed loop responsiveness. According to the responsiveness requirement, after a mobile station receives a reduce power instruction from the base station, the mobile station must begin reducing power within a short defined amount of time. When communicating at full rate, this amount of time is 2.5 ms. Since, at full rate, power control instructions arrive from the base station every 1.25 ms, total output power is required to begin decreasing by the time two subsequent valid power control instructions are received from the base station. Since, as discussed above, it may take 24 or more steps to pull the closed loop gain control system out of saturation, conventional power control systems may be unable to satisfy the closed loop responsiveness requirement.

Developing an efficient and reliable solution to this problem which works in all situations yet doesn't prevent the resulting system from satisfying the other requirements is not an obvious process. Part of the difficulty rests with the fact that the open loop system also often continues to increase after the maximum total output power has been reached. Furthermore, large temporary obstacles, such as buildings, require rapid modifications to the output power. Thus a system is needed which is able to meet the industry standard specifications in rapidly changing conditions. Finally, there is also the need that the closed loop range be greater than plus or minus 24 dB to compensate for component tolerances in production and other potential variations. Unfortunately, addressing this need by expanding the range creates the potential for even greater saturation of the closed loop gain control system.

There is, therefore, a need in the industry for a method and an apparatus for addressing these and other related, and unrelated, problems.

SUMMARY OF THE INVENTION

Briefly described, the present invention includes a method and an apparatus for maintaining responsiveness of a closed loop gain control system within a radio telephone. According to a first preferred embodiment, the invention apparatus includes an output detector and an output comparator coupled between a mobile station modem (MSM) ASIC and a directional coupler positioned after a radio frequency (RF) power amplifier in the transmission signal line. The output detector generates a direct current (DC) representation of the total output power of the radio telephone which is continuously compared to a constant DC value by an operational amplifier in the output comparator to determine if the total output power has exceeded an output power trigger level to reach a maximum output power level. The results of this continuous comparison are input into the MSM ASIC through a readable input/output (I/O) port which is continually examined by a specially-programmed central processing unit (CPU) every 1.25 ms.

Further in accordance with the first preferred embodiment of the present invention, while the total output power of the radio telephone is below the output power trigger level, the total output power is determined in a conventional manner. This first mode includes a combination of an open loop gain control system and a closed loop gain control system using a pulse density modulated output from a closed loop power control register located in the MSM ASIC which is conventionally controlled by closed loop power control information received from the base station. However, when the total output power rises above the output power trigger level, the CPU detects the occurrence through the MSM ASIC I/O port and begins operation according to a second (saturation prevention) mode whereby the closed loop power control register is controlled by the CPU instead of by closed loop power control information received from the base station.

One preferred method of controlling the closed loop power control register located within the MSM ASIC during the second (saturation prevention) mode of operation includes modifying the closed loop power control register to decrement the total output power until the total output power falls below the output power trigger level. Thus, as long as the output comparator indicates through the MSM ASIC I/O port that the total output power has reached a maximum level by exceeding the output power trigger level, the CPU will continue to decrement the closed loop power control register. (Since the open loop component of the total output varies, the term "maximum power", etc., should be understood to be one of a very small range of output power levels above the output power trigger level.) In this way, the CPU disregards any closed loop power control information received from the base station by both decrementing the closed loop power control register without evaluating the closed loop control information received as well as disabling the effect of such information. Furthermore, changes in the open loop gain control system are also taken into immediate consideration since the total output power is being continuously detected and continually examined by the CPU to provide a consistent and reliable solution. As the total output power falls below the output power trigger level, the power control system of the present invention returns to conventional closed loop control of the closed loop power control register according to the first mode. Subsequently, the power control system of the first preferred embodiment of the present invention continues to alternate between the first and second modes in response to the total output power reaching an falling below the maximum output level.

According to a second preferred embodiment of the present invention, the MSM ASIC I/O port is initially configured to be an edge-triggered interrupt port. In this configuration as an edge-triggered interrupt port, the MSM ASIC I/O port is not continually examined by the CPU. Thus, the output comparator signal is essentially ignored by the CPU (saving CPU resources) until a transition of the total output power rising above the output power trigger level is detected and indicated by the output detector and output comparator, respectively. As this transition is detected, an interrupt service routine is initiated in the CPU. Control of the closed loop power control register then shifts from conventional closed loop control by the MSM ASIC to saturation prevention control by the CPU. The closed loop power control register is then modified to decrement the total output power by one step, and the MSM I/O port is reconfigured to be a readable port. Then, like the method of the first preferred embodiment, while the total output power remains above the output power trigger level, the CPU continues to modify the closed loop power control register to decrement the total output power until the total output power falls below the output power trigger level. When this happens, the interrupt service routine terminates by again configuring the MSM I/O port as an edge-triggered interrupt port and enabling conventional closed loop control of the closed loop power control register. Depending on availability, separate MSM ASIC ports can also be utilized for interrupt and reading functionality to accomplish the above functions.

Another preferred embodiment of the present invention includes initially configuring the MSM ASIC I/O port as a level-triggered interrupt port. As the output comparator indicates that the total output power has reached the maximum output level, an interrupt service routine is initiated in the CPU after the level-triggered interrupt port detects a new level from the output comparator. During this routine, additional servicing of the interrupt port is disabled until this routine is completed, and saturation prevention control of the closed loop power control register begins. The closed loop power control register is then modified to decrement to total output power by one step before the closed loop power control register is immediately returned to conventional closed loop power control. After a subsequent delay, interrupt servicing is re-enabled, and the interrupt servicing routine terminates. Since saturation prevention control of the closed loop power control register has a very short duration, all power control information from the base station affects the closed loop power control register. Thus, if the next base station power control information received by the mobile station during the delay was another increase power instruction, the interrupt service routine will likely be triggered immediately, depending on changes in the open loop component of the total output power.

Yet another preferred embodiment of the present invention includes the substitution of an analog-to-digital converter for the output comparator of the first preferred embodiment of the present invention. Instead of, as in the first preferred embodiment, continuously comparing a detected DC representation of the total output power to a constant DC level through an operational amplifier, this next preferred embodiment continually samples output from the output detector. The digital samples are input directly to the CPU where they are compared to a stored representation of the output power trigger level. As with the first preferred embodiment of the present invention, until the total output power is found to rise above the output power trigger level, the closed loop power control register is controlled according to a conventional closed loop gain control mode. Likewise, when the total output power is detected to be too high (above the output power trigger level), the CPU enters a saturation prevention mode to assume control of the closed loop power control register and modify the register to reduce the total output power until it falls below the output power trigger level.

Two final preferred embodiments of the present invention include using measurements of the received signal strength as a factor in modifying the closed loop power control register. The primary differences between the two embodiments are related to the means for determining when the total output power is above the output power trigger level; one embodiment utilizes an output detector and an output comparator similar to that of the first preferred embodiment, and the other embodiment utilizes an analog-to-digital converter similar to that of the previous preferred embodiment. In both embodiments, after it is determined that the total output power has exceeded the output power trigger level, a maintaining saturation prevention process is executed until the mobile station receives from the base station power control information instructing the mobile station to reduce total output power. During the maintaining saturation prevention mode, the closed loop power control register is maintained at a constant level unless it is detected that the received signal strength falls (resulting in an increasing open loop factor in the total output power) while in the saturation prevention mode. Upon detection of a falling received signal strength, a relative drop in received signal strength is computed, and compensation is made through the closed loop power control register to prevent the open loop gain control system from pushing the power control system into saturation while the closed loop power control register is otherwise being maintained at a constant value. When the mobile station does finally receive from the base station power control information instructing the mobile station to reduce total output power, the closed loop power control register is modified to reduce the total output power in accordance with a final received signal strength comparison plus an additional step in response to the base station instruction. After a delay, conventional closed loop control is returned to the closed loop power control register.

It is, therefore, an object of the present invention to provide a method and an apparatus for maintaining responsiveness of a closed loop gain control system within a radio telephone.

Another object of the present invention is to provide a saturation prevention method and apparatus for a radio telephone with open and closed loop gain control systems.

Yet another object of the present invention is to provide a radio telephone output power control system which begins decreasing output power within a specified time after receiving a decrease power instruction from a base station.

Yet another object of the present invention is to provide a radio telephone output power control system which modifies a closed loop power control register to prevent response time saturation and limit output power.

Yet another object of the present invention is to provide an RF output detector and an RF output comparator continuously indicating when the RF output power exceeds an output power trigger level.

Still another object of the present invention is to provide a saturation prevention system which includes an operational amplifier output comparator as a basis for overriding conventional closed loop gain control system modification of a closed loop power control register.

Still another object of the present invention is to provide a saturation prevention system which includes an output detector and an analog-to-digital converter as a basis for overriding conventional closed loop gain control system modification of a closed loop power control register.

Still another object of the present invention is to provide a saturation prevention system which automatically reduces output power upon detecting a threshold excessive condition.

Still another object of the present invention is to provide a saturation prevention system for limiting output power of a radio telephone to comply with absolute power and spurious emissions requirements.

Still another object of the present invention is to provide a saturation prevention system which evaluates received signal strength in modifying a closed loop power control register.

Still another object of the present invention is to provide a saturation prevention system which initiates a saturation prevention process when output power exceeds an output power trigger level, wherein the saturation prevention process includes gradually decrementing the total output power through modification of a digital memory element.

Still another object of the present invention is to provide a saturation prevention system which initiates a saturation prevention process when output power exceeds an output power trigger level, wherein the saturation prevention process includes ignoring closed loop power control information received from the base station.

Still another object of the present invention is to provide a saturation prevention system initiates a saturation prevention process when output power exceeds an output power trigger level, wherein the saturation prevention process includes maintaining a closed loop power control register at a constant value unless received signal strength drops, otherwise compensating for the increased open loop component.

Other objects, features and advantages of the present invention will become apparent upon reading and understanding the present specification, when taken in conjunction with the accompanying drawings.

DETAILED DESCRIPTION OF THE PREFERRED EMBODIMENTS

Figure 1:
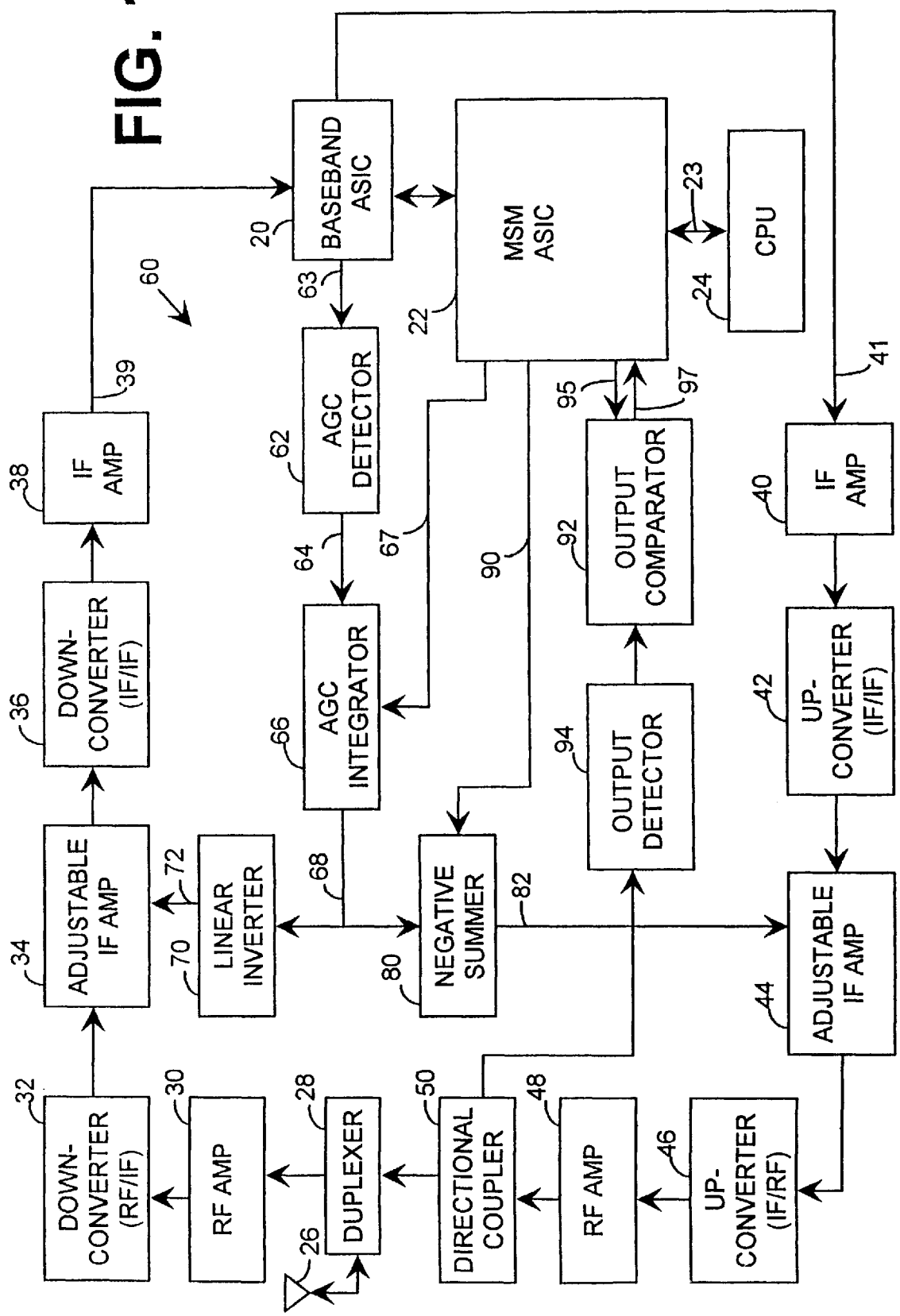
FIG. 1 is a block diagram representation of portions of a radio telephone in accordance with a first preferred embodiment of the present invention.

Referring now in greater detail to the drawings in which like numerals represent like components throughout the several views, FIG. 1 shows a block diagram representation of portions of a code division multiple access (CDMA) spread spectrum cellular radio telephone in accordance with a first preferred embodiment of the present invention. Selected receiver and transmitter circuital elements are connected to a baseband application-specific integrated circuit (ASIC) 20, a mobile station modem (MSM) ASIC 22, and a central processing unit (CPU) 24 which is connected to the MSM ASIC 22 through an address/data bus 23. In accordance with the first preferred embodiment of the present invention, the baseband ASIC 20 includes customary means for providing low frequency analog processing and conversion of signals to and from the digital domain for interfacing with the MSM ASIC 22. In particular, functions of the baseband ASIC 20 include intermediate frequency (IF) to baseband conversion (and vice-versa), baseband and IF filtering, baseband signal quadrature splitting and combining, baseband analog to digital and digital to analog conversion, baseband direct current (DC) offset control, local oscillator quadrature generation, and clock amplitude adjustments. Further in accordance with the first preferred embodiment of the present invention, the MSM ASIC 22 conventionally provides the majority of physical layer signaling through a demodulating unit, a decoding unit, and an interleaving/deinterleaving unit. Among other functional elements, the demodulating unit includes multiple path and searching receivers along with a signal combiner; the decoding unit includes a viterbi decoder and data quality verification means; and the interleaving/deinterleaving unit includes a convolutional encoder, an interleaver, a deinterleaver, a psuedo-random number (PN) sequence spreader, a data burst randomizer, and a finite impulse response (FIR) filter. In addition to customary memory and support circuitry, the CPU 24 includes a conventional static CMOS (complementary-symmetry metal-oxide-semiconductor) high-integration microprocessor with general registers, segment registers, base registers, index registers, status registers, and control registers.

The following describes examples of acceptable elements in accordance with the first preferred embodiment of the present invention. Except for the internal configuration modifications discussed herein (programming, etc.) prior art examples of an acceptable CPU 24, MSM ASIC 22, and baseband ASIC 20 are, respectively, the 80C 186 microprocessor available from Advanced Micro Devices of Sunnyvale, Calif., the Q53101-1S2 baseband ASIC available from Qualcomm, Inc. of San Diego, Calif., and the Q52501-1S2 MSM also available from Qualcomm, Inc. Furthermore, it should be understood that the portions of the radio telephone shown in FIG. 1 are only selected parts of the total cellular telephone which includes a host of other components which, although not shown in any FIGS., would be readily understood by those skilled in the art regarding the operation of, and the need for, such components. Furthermore, the circuital blocks shown should be understood to primarily include elements providing the named function as well as customary filtering, noise reducing, and biasing circuitry.

As a radio signal is received through an antenna 26, a duplexer 28 directs the signal to a radio frequency (RF) receiver amplifier 30 which amplifies the received signal before supplying it to a downconverter circuit 32 which converts the amplified RF signal into an IF signal. An adjustable gain IF receiver amplifier circuit 34 receives and amplifies the IF signal before directing it to another downconverter circuit 36 which converts the received IF signal into a lower frequency IF signal. An IF receiver amplifier circuit 38 provides additional amplification before the receiver IF signal is provided to the baseband ASIC 20 through an IF input line 39. The baseband ASIC 20 also supplies a transmitter IF signal to an IF transmitter amplifier circuit 40 through an IF output line 41. After amplification, the transmitter signal is converted to a higher IF frequency through upconverter 42 and then adjustably amplified through an adjustable gain IF amplifier circuit 44. An upconverter circuit 46 then converts the IF signal into an RF signal which is then amplified by an RF amplifier 48. A directional coupler 50 passes the RF signal through to the duplexer 28 which directs the RF transmitter output signal to the antenna 26 for final output.

Through continuous adjustment of the amount of amplification provided by the adjustable gain IF receiver amplifier circuit 34, the receiver IF signal is maintained within a small range of variations for acceptable input into the baseband ASIC 20. Control of the adjustable gain IF receiver amplifier circuit 34 is accomplished by an automatic gain control circuit (AGC) 60. An AGC detector circuit 62 receives a representative IF signal through AGC input line 63. As is discussed in greater detail below, a direct current (DC) signal is output from the AGC detector circuit 62 through an AGC detector output line 64 which represents the strength of the received signal. An AGC integrator circuit 66 compares the DC signal to a relatively constant AGC reference signal received over an AGC reference line 67 from the MSM ASIC 22. The integrated difference between the two signals is output onto an open loop output line 68 which is connected to a linear inverter 70 supplying an AGC control signal to the adjustable gain IF receiver amplifier circuit 34 over a receiver amplification control line 72. The linear inverter 70 inverts the signal received over the open loop output line 68 to create an inverse relationship between the received signal strength and the amount of amplification provided by the adjustable gain IF receiver amplifier circuit 34. Thus, for example, as received signal strength drops, the amount of amplification provided by the adjustable gain IF receiver amplifier circuit 34 increases.

The open loop output line 68 also provides an input to a negative summer circuit 80 which controls the adjustable gain IF transmitter amplifier circuit 44 through a transmitter amplification control line 82. In this way, the open loop output line 68 provides the open loop component of the total output power control so that the AGC integrator circuit 66 and AGC detector circuit 62 also contribute to open loop gain control. One of the functions of the negative summer circuit 80, that of creating an inverse relationship between received signal strength and amplification, is similar to that of the linear inverter circuit 70. Thus, for example, without regard to closed loop effects, as received signal strength drops, the amount of amplification provided by the adjustable gain IF transmitter amplifier circuit 44 increases. Regarding closed loop control, the negative summer circuit 80 also receives input directly from the MSM ASIC 22 through a transmit gain adjust line 90. As explained below, the transmit gain adjust signal on the transmit gain adjust line 90 is an analog signal representing the closed loop gain control portion of total output power control as dictated by the transmitter amplification control signal on the transmitter amplification control line 82. The present invention pertains primarily to the process of generating this transmit gain adjust signal on the transmit gain adjust line 90.

The transmit gain adjust signal on the transmit gain adjust line 90 is generated by the MSM ASIC 22 in response to processes internal to the MSM ASIC 22 as well as input received from the baseband ASIC 20, the CPU 24, and an output comparator circuit 92. The output comparator circuit 92 receives input from an output detector circuit 94 which receives input from the directional coupler 50. In general terms, the output detector circuit 94 generates a DC signal representative of the total output power of the radio telephone. This DC signal is compared inside the output comparator circuit 92 to a constant comparator threshold voltage on line 95 generated by the MSM ASIC 22 as a representation of an output power trigger level. The result of the continuous comparison is output on line 97 from the output comparator circuit 92 to the MSM ASIC 22.

Figure 2:
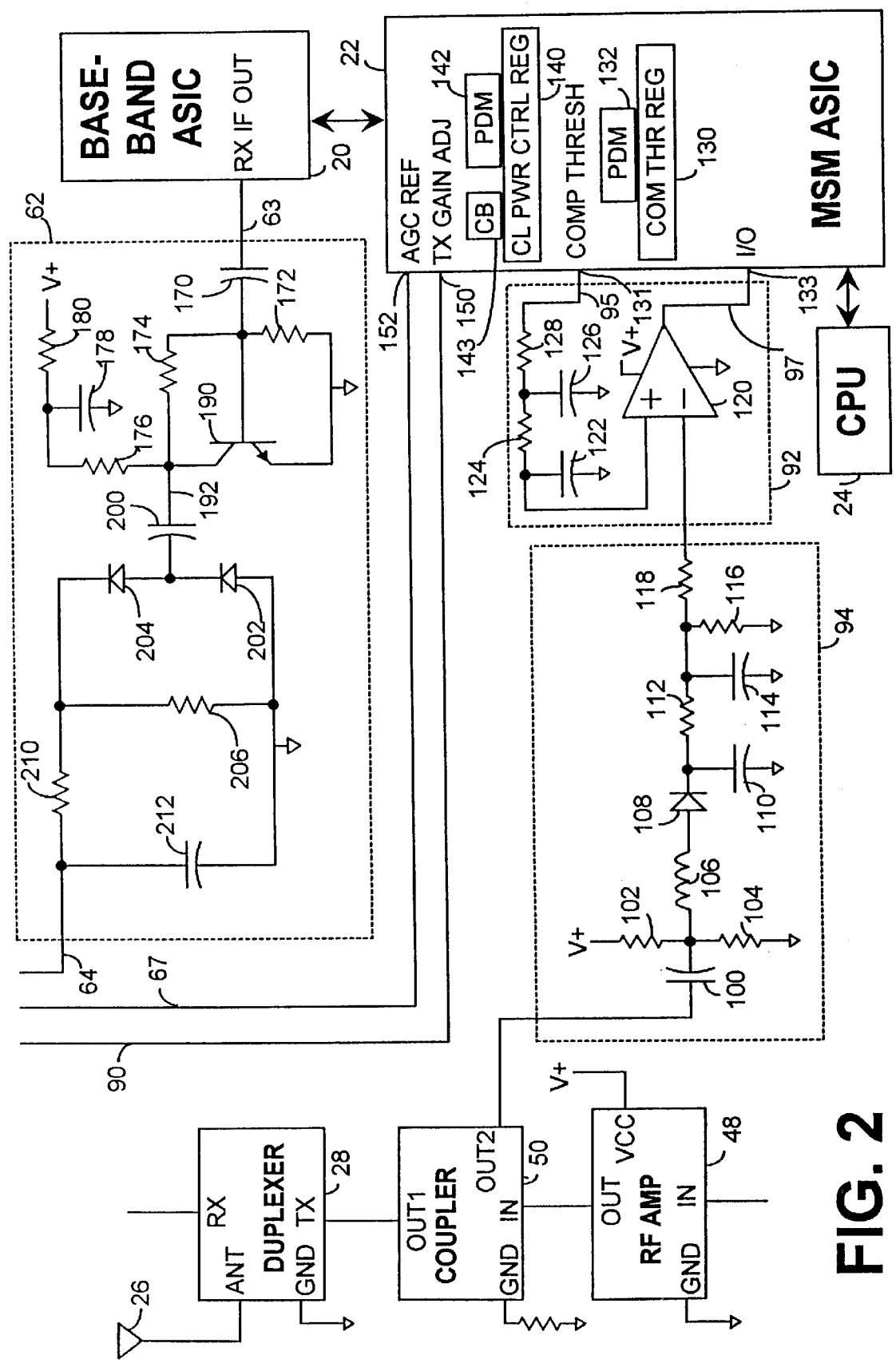
FIG. 2 is a schematic view of selected elements shown in FIG. 1.

Refer now to FIG. 2 for a schematic view of selected elements of FIG. 1.

The directional coupler 50 directs a small representative portion of the output signal from the RF amplifier 48 through a pin labeled OUT2. The signal flowing from the OUT2 pin is received by the output detector 94 which generates a DC signal representative of the total output power of the radio telephone. An AC-coupling capacitor 100 removes any DC component from the signal output from the directional coupler 50. After filtering and conditioning by biasing resistors 102 and 104 and inductor 106, a diode 108 functions as a half-wave rectifier to convert the remaining AC signal into a half-wave rectified signal. The output from diode 108 is smoothed and prepared for input to the output comparator circuit 92 by capacitors 110 and 114 and resistors 112, 116, and 118.

The output comparator circuit 92 receives the DC signal representative of the total output power from the output detector circuit 94. The DC signal is continuously compared through an operational amplifier 120 to a constant signal set by the MSM ASIC 22. The constant signal is output through a comparator threshold (COMP THRESH) output 131 of the MSM ASIC 22 before being filtered and conditioned for input into the non-inverting input of the operational amplifier 120. The COMP THRESH signal is a pulse density modulated representation of a comparator threshold register 130 located within the MSM ASIC 22 and generated by a similarly located pulse density modulator (PDM) 132. PDM 132 essentially provides a digital-to-analog conversion of the constant value represented in the comparator threshold register 130, a digital memory element.

Since output from the output detector circuit 94 is directed into the inverting input of the operational amplifier 120, the operational amplifier outputs a high signal into an input/output (I/O) port 133 of the MSM ASIC 22 as long as the output from the output detector circuit 94 is lower than the filtered and conditioned constant output from the COMP THRESH output of the MSM ASIC 22. This condition corresponds to the total output power of the radio telephone being below the output power trigger level. However, when the total output power of the radio telephone rises above the output power trigger level, the condition is indicated by a transition from high to low at the output of the output comparator circuit 92. The output remains low until the output from the output detector circuit 94 once again falls below the filtered & conditioned COMP THRESH level, an event signifying that the total output power of the radio telephone has fallen below the output power trigger level.

Through methods which are discussed in greater detail below, the MSM ASIC 22 and CPU 24 utilize the signal levels detected from the output comparator 92 to modify a closed loop power control register (CL PWR CTRL REG) 140 located within the MSM ASIC 22. Like the comparator threshold register 130 and PDM 132, a PDM 142 provides an analog representation of values stored in the closed loop power control register 140. This analog representation is output through a transmit gain adjust (TX GAIN ADJ) output 150 of the MSM ASIC onto the transmit gain adjust line 90 which is connected to the negative summer 80 shown in FIG. 1. An AGC reference output 152 is also shown supplying the AGC reference signal onto the AGC reference line 67. The MSM ASIC 22 also includes a control bit (CB) 143 located in another area of MSM ASIC 22 memory which is writeable by the CPU 24 and which controls whether the CPU 24 controls the closed loop power control register 140 or the MSM ASIC 22 controls the closed loop power control register 140 through conventional closed loop power control techniques.

The baseband ASIC 20 is shown supplying a representative receiver IF signal onto the AGC input line 63 through a receiver IF output (RX IF OUT) to the AGC detector 62. The representative receiver IF signal is examined by the AGC detector 62 to yield on the AGC detector output line 64 a DC representation of the received signal strength. A capacitor 170 blocks any DC component of the signal on the AGC input line 63. Biasing elements 172, 174, 176, 178, and 180 are sized to bias a bipolar transistor 190 in the active amplification region so that a constant amount of gain is applied between the base and the collector of the bipolar transistor 190 which is connected to the amplified line 192. The amplified line 192 is connected to a capacitor 200 which is further connected to the cathode of a diode 202 with a grounded anode and to the anode of diode 204. The cathode of the diode 204 is connected to a grounded resistor 206 and a resistor 210 which is connected to the AGC detector output line 64 along with a grounded capacitor 212. Since capacitor 200 is connected in series (AC-coupled) with subsequent elements, capacitor 200 removes the DC component from the AGC input signal and cooperates with the diodes 202, 204 to add a new DC level to the AC component which is linearly proportional to the incoming AC signal level. As the AC signal level rises, the capacitor 200 is charged, and when the AC signal level falls, the diode 202 turns on, resulting in an upward voltage shift. Resistor 210 and capacitor 212 function as a low pass filter to remove the remaining AC component to leave a DC signal which is linearly proportional to the AC signal level of the AGC input signal. In addition, the resistor 210 functions as an averaging means to slow the charge of capacitor 212 so that the AGC output signal on the AGC detector output line 64 is an averaged linear output. Furthermore, the resistors 206 and 210 are preferably approximately equal in value.

Figure 3:
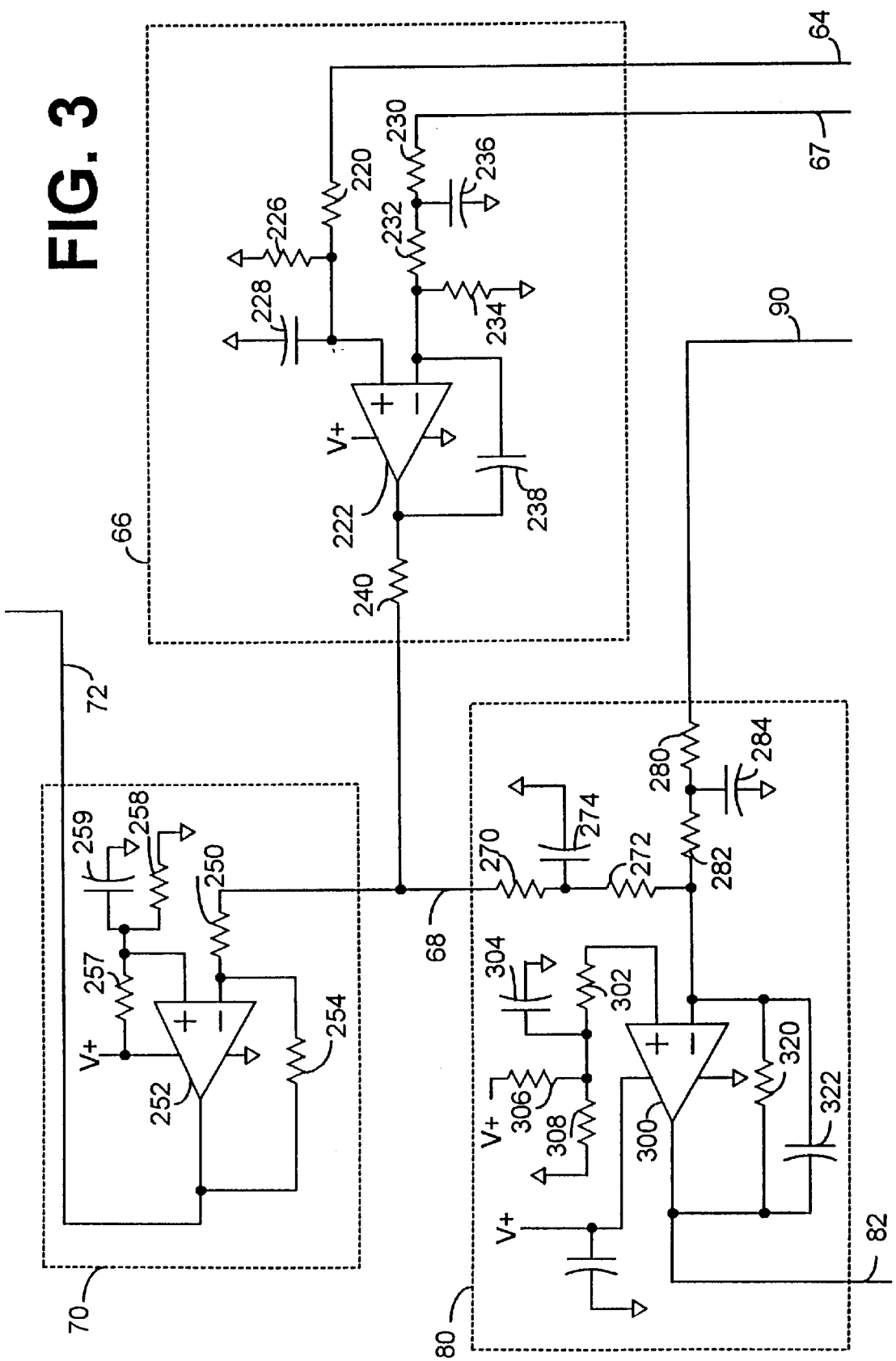
FIG. 3 is a schematic view of selected additional elements shown in FIG. 1

Refer now to FIG. 3 for a schematic view of the AGC integrator circuit 66, the linear inverter 70, and the negative summer 80. The AGC detector output line 64 is shown supplying signals through a biasing resistor 220 to the non-inverting input of an operational amplifier 222, which input is also connected to biasing components 220, 226, and 228. The AGC REF line 67 is shown providing the relatively constant AGC reference signal through a network of biasing elements 230, 232, 234, and 236 to the inverting input of the operational amplifier 222. The output and inverting input of the operational amplifier 222 are shown connected through a capacitor 238 so that the operational amplifier 222 functions as an open loop integrator to produce a gain control signal on the open loop output line 68 equal to the difference between the signal levels on the AGC detector output line 64 and the AGC REF line 67. The linear inverter 70 is shown receiving the gain control signal on the open loop output line 68 and providing output through the receiver amplification control line 72. The open loop output line 68 is shown connected through a resistor 250 to the inverting input of an operational amplifier 252. A resistor 254 is shown connected between the output and inverting input of the operational amplifier 252, whereas the non-inverting input of the op amp 252 is grounded through a network of biasing elements 257, 258, and 259. Thus, the operational amplifier 252 functions as an inverting amplifier operating in a linear manner without undue complexity.

The negative summer 80 is shown receiving open and closed loop signals through the open loop output line 68 and the transmit gain adjust line 90, respectively. After passing through biasing/filter networks composed of resistors 270, 272, 274, 280, 282, and 284, signals are combined from the open loop output line 68 and the transmit gain adjust line 90 at the inverting input of an operational amplifier 300. The biasing filter networks (270–284) exhibit time constant delays appropriate for ensuring stable operation. According to the first preferred embodiment of the present invention, the delays introduced are approximately 30 ms on the open loop output line 68 and 0.5 ms on the transmit gain adjust line 90. The operational amplifier 300 is biased, through elements 302, 304, 306, 308, 320, and 322 to amplify and invert the sum of the two input signals and provide output on the transmitter amplification control line 82. Thus, it is through the operational amplifier 300 that both closed loop gain control and open loop gain control components are combined to control total output power of the radio telephone.

Figure 4:
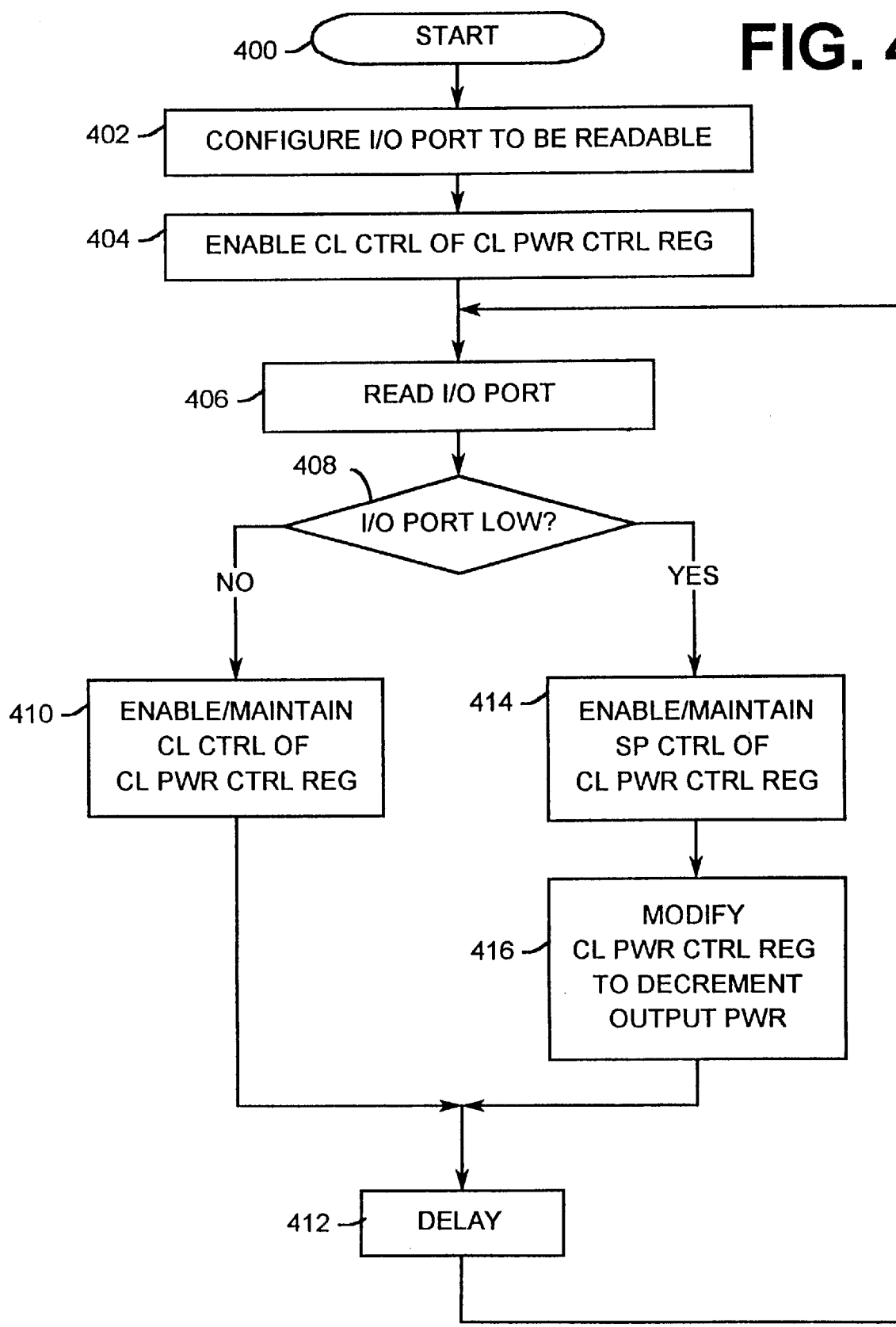
FIG. 4 is a flow chart representation of a power control process for the elements shown in FIG. 1, in accordance with one preferred embodiment of the present invention.

FIG. 4 is a flow chart representation of a power control process for the elements shown in FIG. 1, in accordance with one preferred embodiment of the present invention. Referring primarily to FIG. 4 with additional reference to FIGS. 1 and 2, after the process starts in step 400, the I/O port 133 is configured to be a general purpose I/O port which is readable by the CPU 24 in step 402, unless already configured as such. Subsequently, according to step 404, conventional closed loop control of the closed loop power control register 140 by the MSM ASIC 22 is initiated by the CPU 24. According to this first preferred embodiment of the present invention, the process of step 404 includes initializing the control bit 143 in the state allowing normal MSM ASIC 22 control of the closed loop power control register. Subsequently, the I/O port 133 is read by the CPU 24 in step 406. If the I/O port 133 is found to be receiving a high signal (e.g., +5 volts), the NO branch of decision block 408 directs operation to step 410 where conventional closed loop control of the closed loop power control register 140 is maintained (i.e., the control bit 143 is left unchanged). Then, a delay step 412 indicates that the process of FIG. 4 delays for a predetermined amount of time before operation repeats back to step 406. According to this first preferred embodiment of the present invention, this delay corresponds to the period of time between receiving closed loop power control information from the base station, such as 1.25 ms. In this manner, a first mode of operation is maintained while the I/O port 133 is high, indicating that the total output power of the radio telephone is below the output power trigger level. Another reason for the delay in the present invention is to allow changes in power control to take effect prior to reading the I/O port 133 again.

On the other hand, when the total output power of the radio telephone exceeds the output power trigger level, the output comparator 92 outputs a low signal onto the I/O port 133. Through the YES branch of decision block 408, operation proceeds to step 414 as a second mode begins to prevent power control saturation and limit maximum output power of the radio telephone. At step 414, the CPU 24 modifies the control bit 143 to enable saturation prevention control of the closed loop power control register 140, thus disabling conventional closed loop power control of that register. Subsequently, the CPU 24 automatically modifies the closed loop power control register 140 to decrement the total output power of the radio telephone by one step. In this preferred embodiment of the present invention, this process includes incrementing the value stored in the closed loop power control register 140 by one step, corresponding to a 1 dB reduction in total output power. In one implementation of the first preferred embodiment of the present invention, the closed loop power control register includes the seven most significant bits of an eight-bit register, thus providing 128 total steps of control (64 bits above the open loop estimate and 64 bits below the open loop estimate). This increased range of closed loop control provides additional ability to accommodate production variances, etc.

After step 416, the delay step 412 indicates another delay before operation again continues with step 406 so that the I/O port 133 is continually read by the CPU 24. The saturation prevention mode continues through repeated loops through the YES branch of decision block 408 so that the closed loop power control register 140 is continually incremented (decrementing total output power) until the total output power falls below the output power trigger level. When this happens, the NO branch of decision block 408 directs operation back to step 410 where conventional closed loop operation resumes. In many circumstances, only one loop through the YES branch of decision block 408 is necessary before alternating back to the NO branch. However, since the open loop gain control system contribution to the total output power may also rise, consecutive loops through the YES branch of decision block 408 are also encountered where the total output power is continually decremented until it falls below the output power trigger level.

Figure 5:
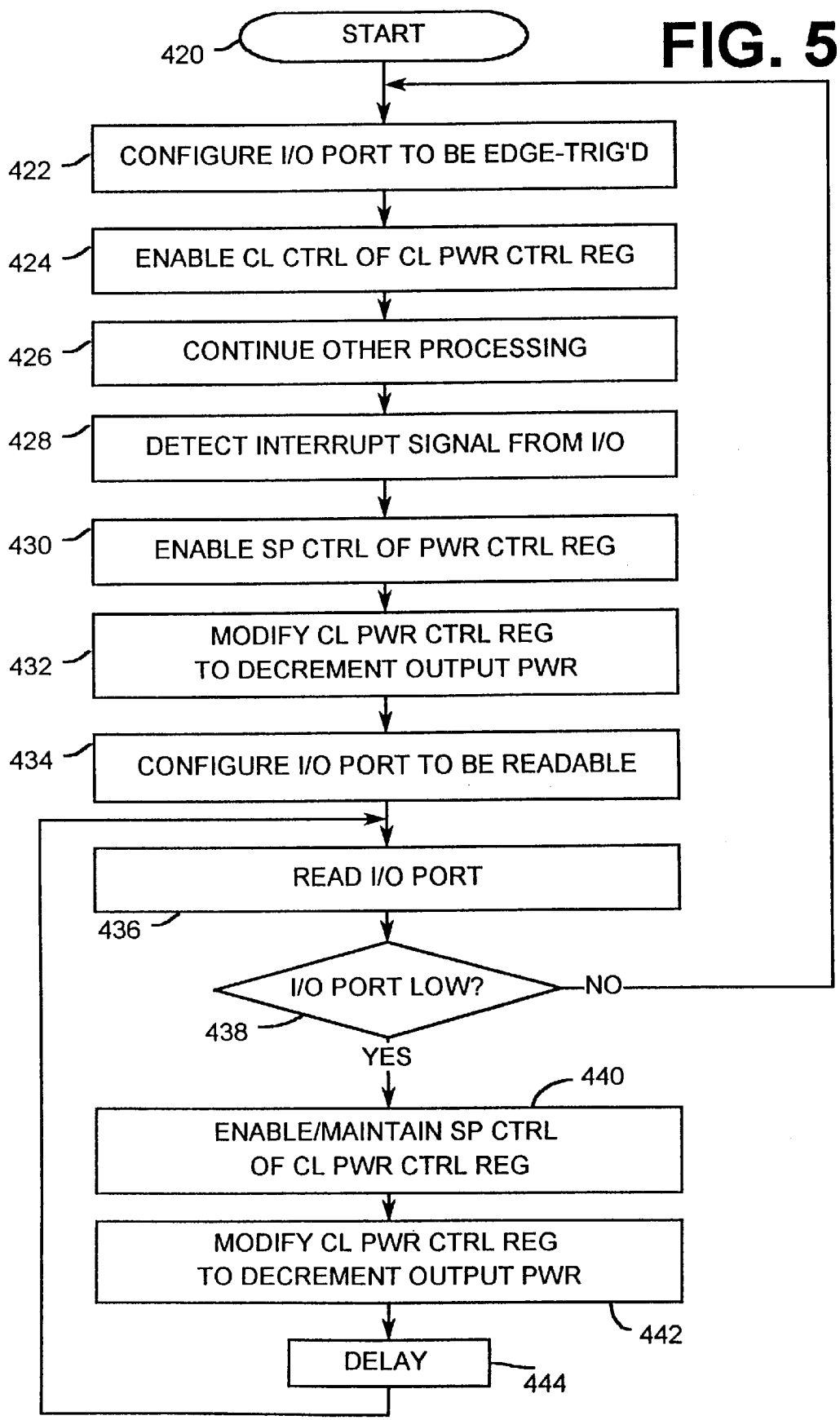
FIG. 5 is a flow chart representation of a power control process for the elements shown in FIG. 1, in accordance with another preferred embodiment of the present invention.

FIG. 5 is a flow chart representation of a power control process for the elements shown in FIG. 1, in accordance with a second preferred embodiment of the present invention. After starting in step 420, this second power control method includes configuring the I/O port 133 as an edge-triggered interrupt port rather than a general purpose readable I/O port. In this configuration as an edgetriggered interrupt port, the MSM ASIC I/O port 133 is not continually examined by the CPU 24. Instead, the MSM ASIC 22 notifies the CPU 24 when the signal output from the output comparator 92 changes from a high signal to a low signal, thus signifying that the total output power of the radio telephone has exceeded the output power trigger level. Thus, the output comparator signal at the I/O port 133 is essentially ignored by the CPU (saving CPU resources) as long as the total output power is below the output power trigger level. As shown in steps 424 and 426, after conventional closed loop control of the closed loop power control register 140 is enabled, the CPU 24 continues with other processing during this first conventional mode of closed loop power control.

As transition from high to low on the I/O port 133 is detected at step 428, an interrupt service routine is initiated in the CPU 24. Control of the closed loop power control register 140 then shifts from conventional closed loop control by the MSM ASIC 22 to saturation prevention control by the CPU 24 in step 430. The closed loop power control register 140 is then modified in step 432 to decrement the total output power by one step (1.0 dB) before the I/O port 133 is reconfigured to be a readable port. Of course, depending on availability, separate MSM ASIC ports can also be utilized for interrupt and reading functionality. Then, like the method of the first preferred embodiment, steps 436–444 indicated that while the total output power remains above the output power trigger level, the CPU 24 continues to modify the closed loop power control register 140 to decrement the total output power until the total output power falls below the output power trigger level. When this happens, as detected by decision block 438, the interrupt service routine terminates by again configuring the I/O port 133 as an edge-triggered interrupt port and enabling conventional closed loop control of the closed loop power control register 140.

Figure 6:
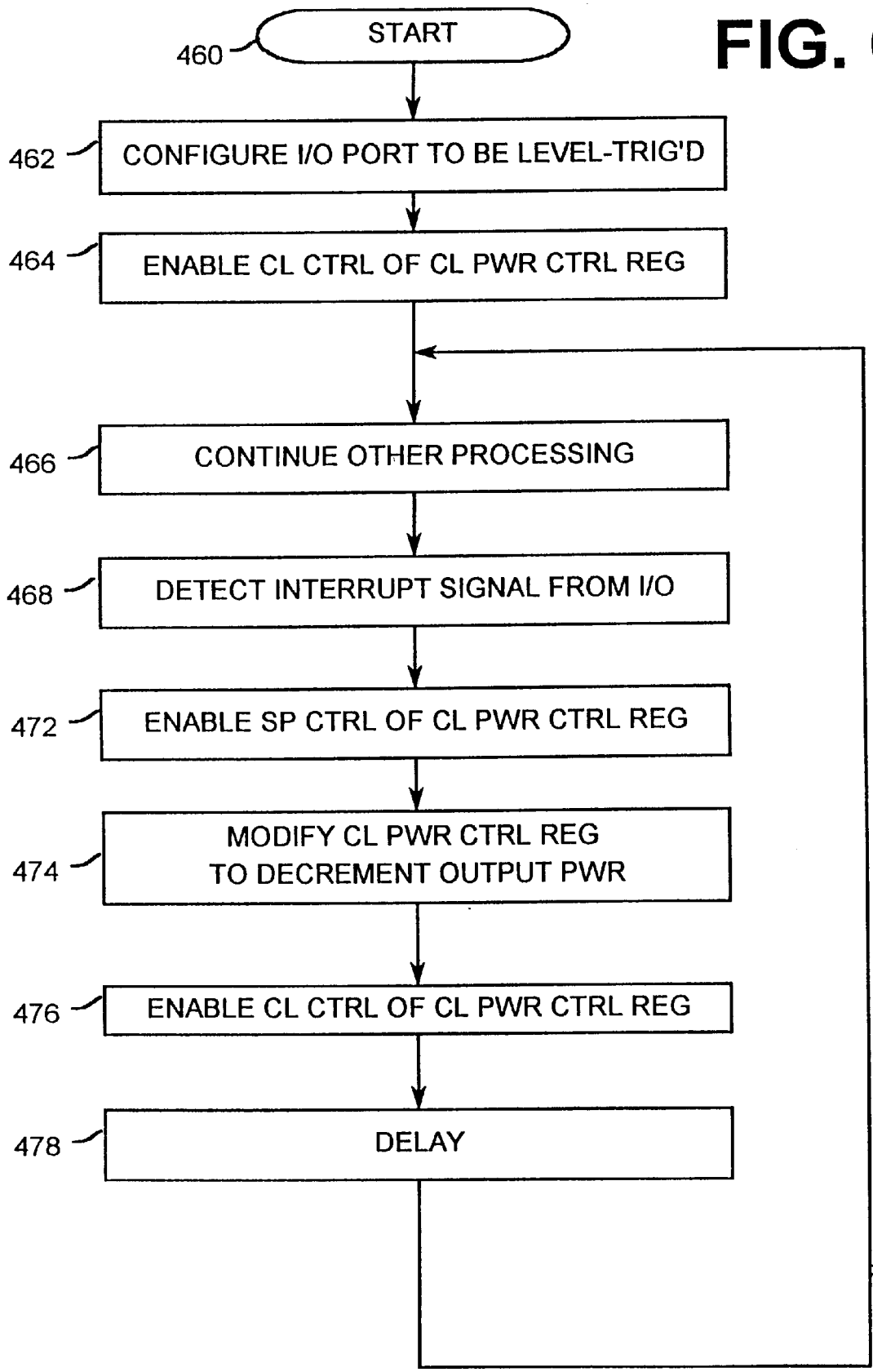
FIG. 6 is a flow chart representation of a power control process for the elements shown in FIG. 1, in accordance with yet another preferred embodiment of the present invention.

FIG. 6 shows a flow chart representation in accordance with yet another preferred embodiment a power control process for the elements shown in FIG. 1. After starting in step 460, the process of FIG. 6 includes configuring the I/O port 133 at step 462 to be a level-triggered interrupt port. An interrupt port of this type is essentially ignored until the input signal reaches a trigger level, such as, in this case, a low signal from the output comparator 92. After enabling conventional closed loop control of the closed loop power control register 140 in step 464, the CPU 24 continues with other processing in step 466 until a level-triggered interrupt signal is generated from the I/O port 133 and detected at step 468 to begin an interrupt service routine. Saturation prevention control of the closed loop power control register 140 begins in step 472. The closed loop power control register 140 is then modified to decrement the total output power by one step before the closed loop power control register 140 is immediately returned to conventional closed loop power control in step 476. After a subsequent delay in step 478, the interrupt servicing routine terminates with processing looping back to step 466. Since saturation prevention control of the closed loop power control register 140 has a very short duration, all power control information from the base station affects the closed loop power control register 140, unlike previously discussed methods. Thus, if the next base station power control information received by the radio telephone during the delay is another increase power instruction, the interrupt service routine will likely be triggered immediately after step 478, depending on changes in the open loop component of the total output power.

Figure 7:
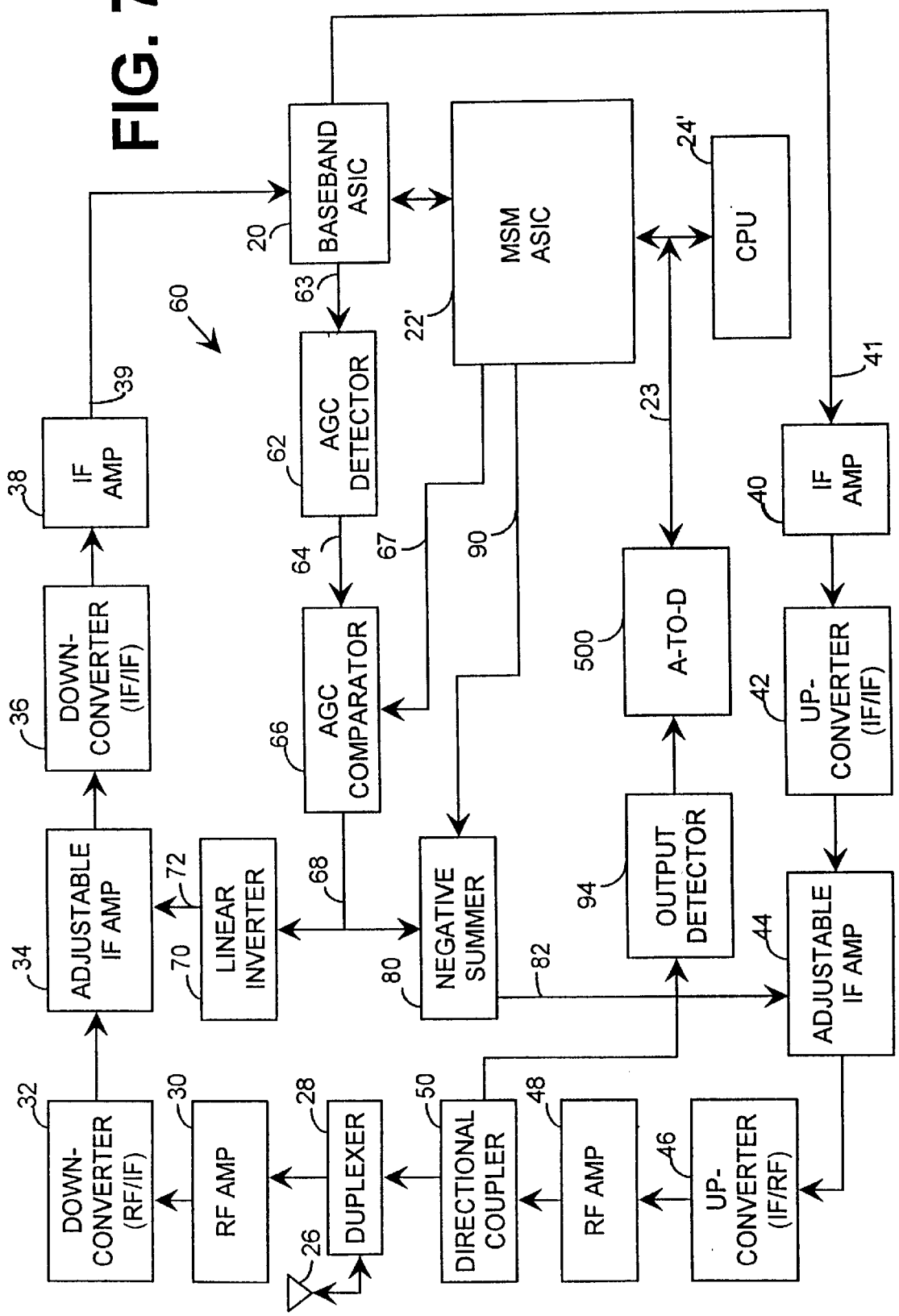
FIG. 7 is a block diagram representation of portions of a radio telephone in accordance with another preferred embodiment of the present invention.

Refer now to FIG. 7 for a block diagram representation of portions of a radio telephone in accordance with another preferred embodiment of the present invention. The elements of FIG. 1 are, independent of programming and memory configurations of MSM ASIC 22' and CPU 24, identical to those of FIG. 1 except for the omission of the output comparator 92 of FIG. 1 and the addition of an analog-to-digital (A-to-D) converter 500 connected between the output detector 94 and the address/bus 23 for direct communication with the CPU 24. While the closed loop power control register 140 and control bit 143 (FIG. 2) also exist in the MSM ASIC 22', the comparison threshold register 130 and associated PDM 132 and output port 133 of the first preferred embodiment are not included as such. Furthermore, instead of, as in the first preferred embodiment, continuously comparing a detected DC representation of the total output power to a constant DC level through an operational amplifier, the radio telephone of the preferred embodiment represented by FIG. 7 continually samples output power through the A-to-D converter 500. The digital samples are input directly to the CPU 24' where they are compared to a stored representation of the output power trigger level.

Figure 8:
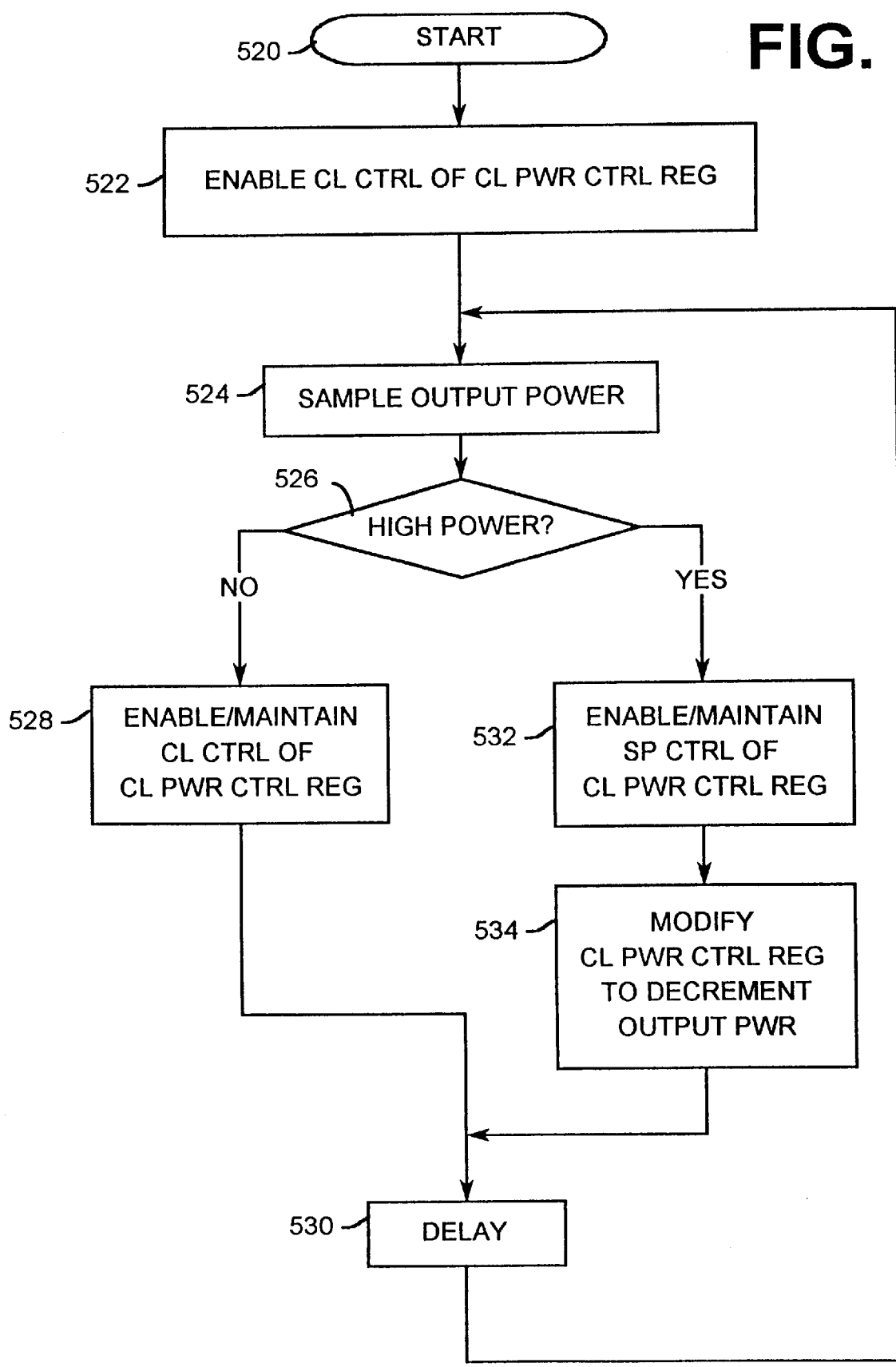
FIG. 8 is a flow chart representation of a power control process for the elements shown in FIG. 7, in accordance with a preferred embodiment of the present invention.

FIG. 8 shows a flow chart representation of a power control process for the radio telephone embodiment represented by FIG. 7. Referring to steps 520–530, as with the first preferred embodiment of the present invention, until the total output power is found to rise above the output power trigger level, the closed loop power control register 140 is controlled according to the conventional closed loop gain control mode. Likewise, referring to steps 532 and 534, when the total output power is detected to be too high (above the output power trigger level), the CPU 24 enters a saturation prevention mode to assume control of the closed loop power control register 140 and modify it to reduce the total output power until the total output power falls below the output power trigger level. One example of an acceptable A-to-D converter 500 is the MAX 153 available from Maxim Integrated Products of Sunnyvale, Calif.

Figure 9:
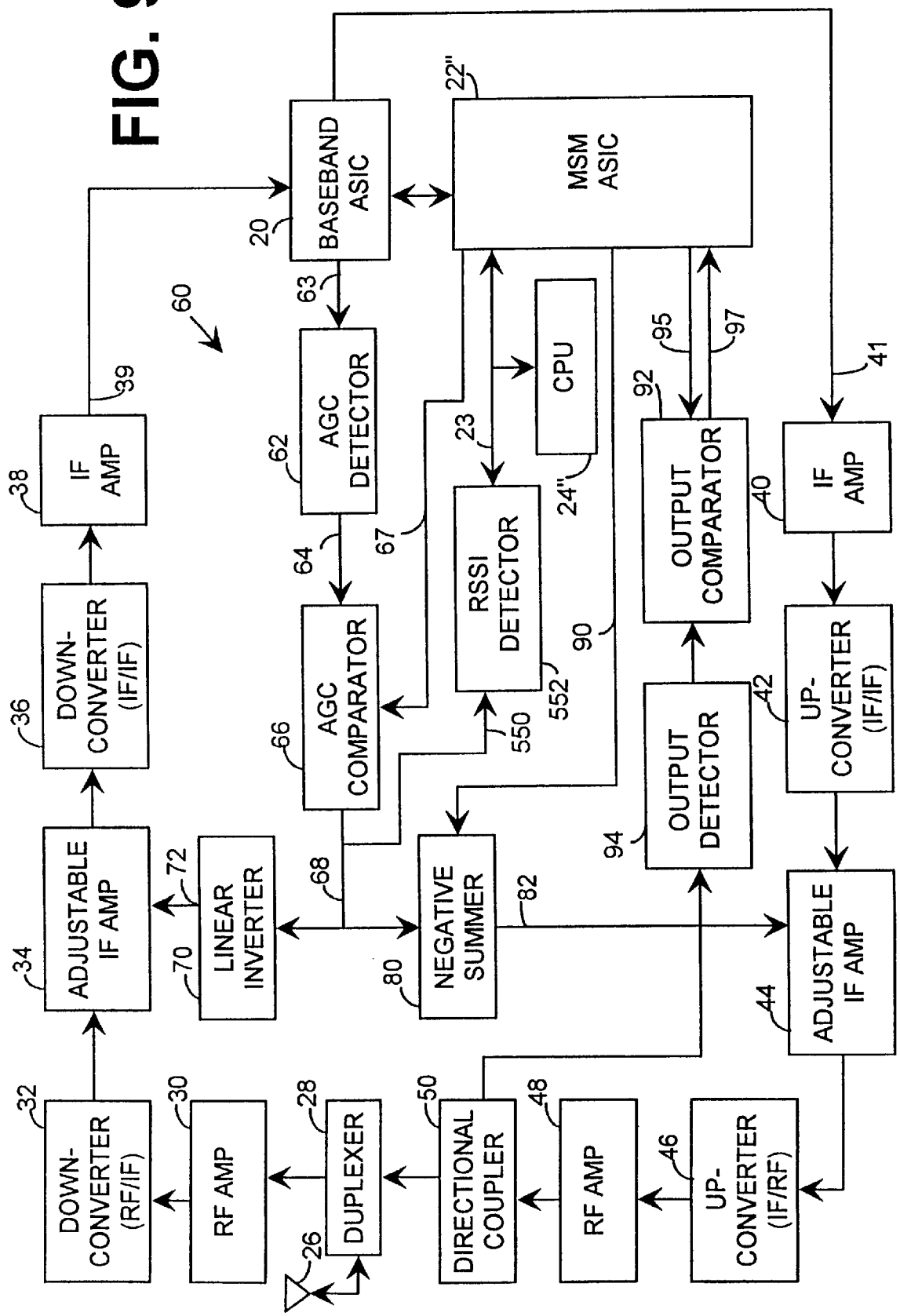
FIG. 9 is a block diagram representation of portions of a radio telephone in accordance with another preferred embodiment of the present invention.
Figure 10:
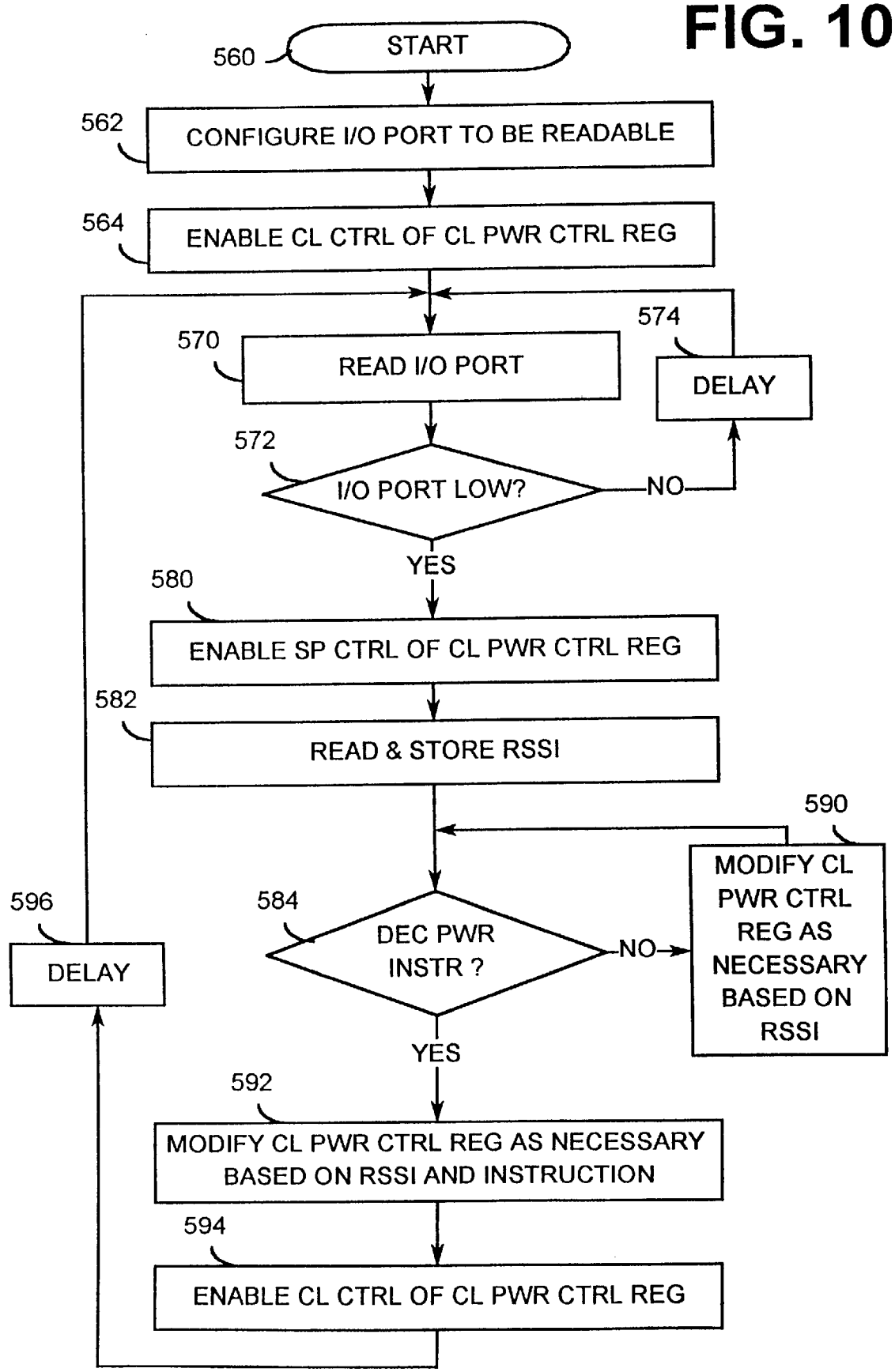
FIG. 10 is a flow chart representation of a power control process for the elements shown in FIG. 9, in accordance with a preferred embodiment of the present invention.

Yet another preferred embodiment of the present invention is disclosed in FIGS. 9 and 10. The block diagram representation of FIG. 9 represents a radio telephone which is extremely similar to that of FIG. 1. The primary difference between FIG. 1 and FIG. 9 is the addition of a received signal strength indicator (RSSI) detector 552 connected to the open loop output line 68 through an RSSI input line 550. One example of an acceptable RSSI detector 552 is the same device given as an example for the A-to-D converter 500 above. The MSM ASIC 22' and CPU 24' are also modified to utilize the RSSI detector 552 as a factor in output power control. The process of FIG. 10 is very similar to that of FIG. 4 in that steps 560–572 are identical to steps 400–408. If a low signal is detected through the I/O port 133, the process is delayed through step 574 and controlled in a loop back to step 570. Otherwise, the YES branch of decision block 572 directs operation to step 580 where saturation prevention control of the closed loop power control register 140 is enabled. At step 582 a received signal strength indication is read from the RSSI detector 552 and stored by the CPU 24".

Subsequently, at step 584, the power control process waits for closed loop control information from the base station requesting the radio telephone to decrease output power. Until such a decrease power instruction is received, the NO branch retains operation in a loop through step 590. Step 590, including an internal delay of one instruction period (e.g., 1.25 ms), represents a continual comparison of a current RSSI with that stored by the CPU 24 in step 582 along with a contingent modification of the closed loop power control register 140 in the MSM ASIC 22". If the received signal strength does not decrease during this loop, no modification is made to the closed loop power control register 140. On the other hand, if the RSSI decreases, the closed loop power control register 140 is modified to compensate for the change. In other words, if the open loop component of the total output power rises, the closed loop power control register is used to compensate. This process utilizes a relative look-up table technique performed by the CPU 24" in determining how much to modify the closed loop power control register 140. Another acceptable technique includes an absolute value look-up table which determines the appropriate value for the closed loop power control register 140 as an absolute function of the received signal strength, as opposed to determining relative differences.

This process continues until a decrease power instruction is received from the base station, directing operation through the YES branch of decision block 584 to step 592. The process of step 592 includes the actions of step 590 (except the internal delay) as well as the additional factor of the decrease power instruction. Thus, the modification to the closed loop power control register 140 of step 592 includes an additional one step (1.0 dB) reduction of output power because of the decrease power instruction. One additional requirement imposed on the MSM ASIC 22' is that base station closed loop power control instructions be available to the CPU 24". Such is not the case with the prior art example MSM ASIC 22 from Qualcomm, thus the present invention needs an MSM ASIC 22' which is so modified from that example. One alternative to the method of this preferred embodiment, as well as to other preferred embodiments disclosed herein, would be to provide another alternate MSM ASIC which internally performed all of the steps of any one of the disclosed processes without CPU 24 involvement. After step 592, conventional closed loop control of the closed loop power control register is enabled in step 594, and a delay is imposed in step 596 before the process loops back to step 570.

Figure 11:
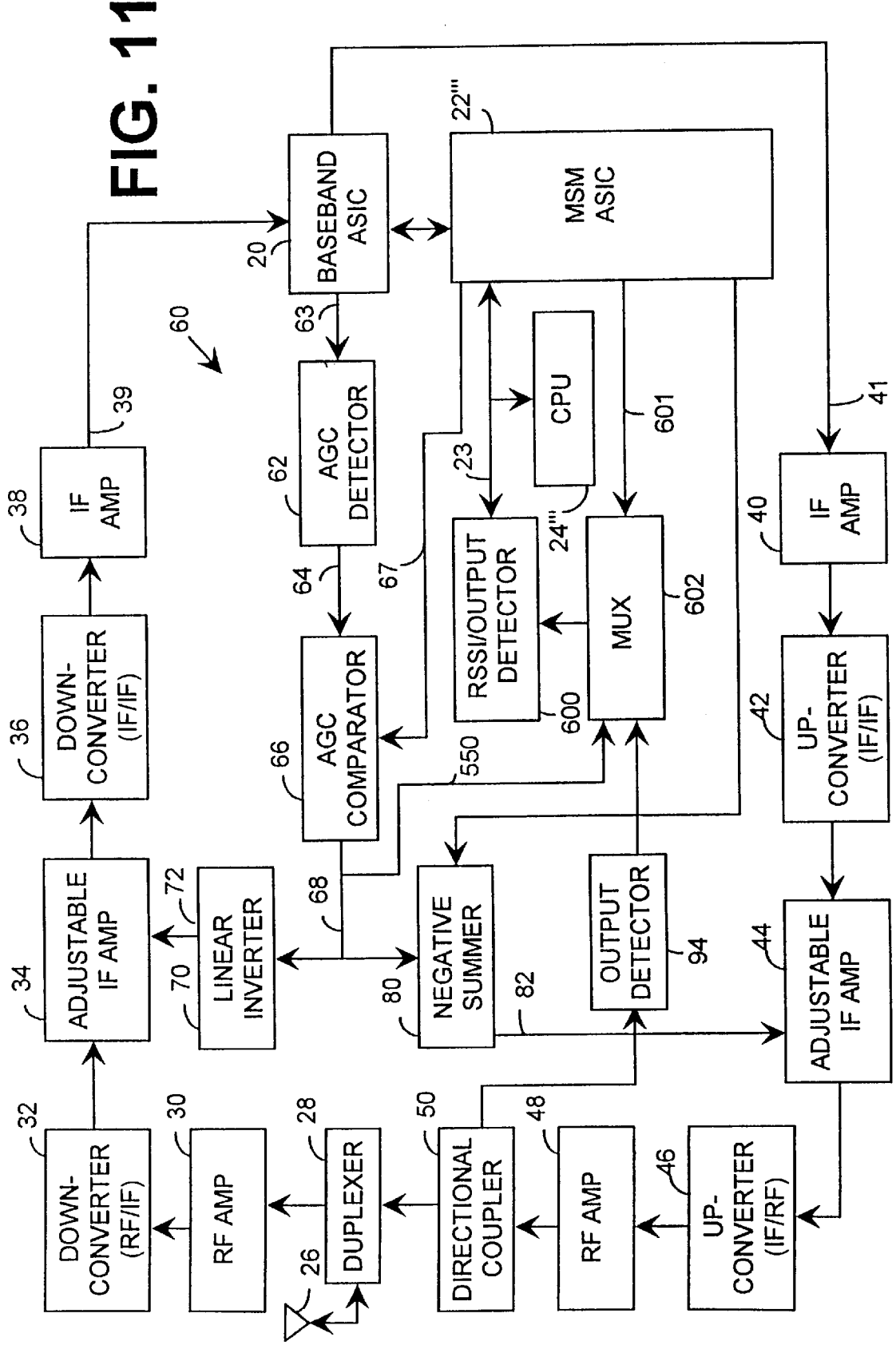
FIG. 11 is a block diagram representation of portions of a radio telephone in accordance with another preferred embodiment of the present invention.
Figure 12:
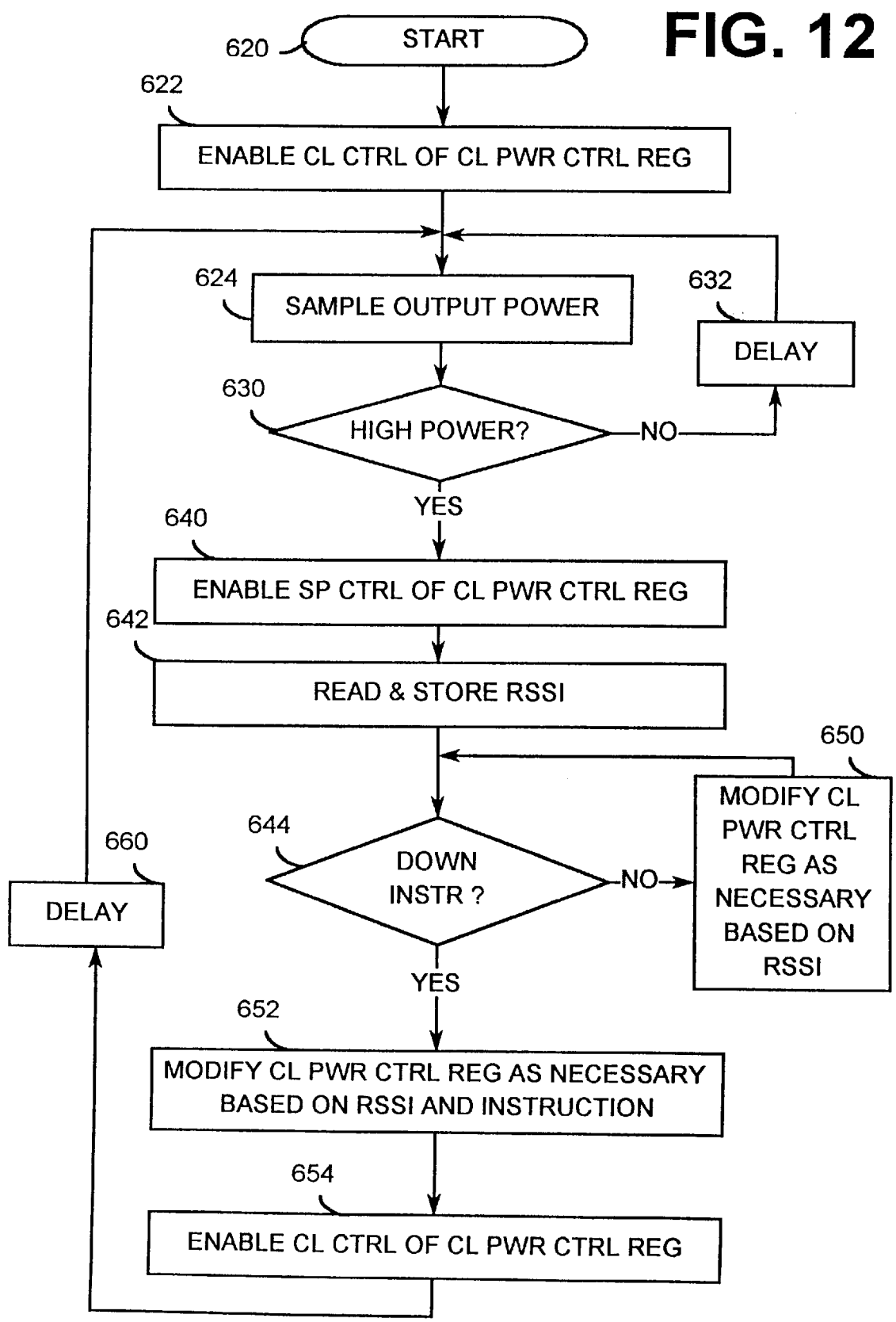
FIG. 12 is a flow chart representation of a power control process for the elements shown in FIG. 11, in accordance with a preferred embodiment of the present invention.

FIGS. 11 and 12 pertain to still another preferred embodiment of the present invention. The primary differences between the preferred embodiment of FIGS. 11 and 12 and the preferred embodiment of FIGS. 9 and 10 are related to the means for determining when the total output power is above the output power trigger level. The previous preferred embodiment (FIGS. 9 and 10) utilizes an output detector 94 and an output comparator 92 similar to that of the first preferred embodiment. On the other hand, the present preferred embodiment (FIGS. 11 and 12) utilizes an RSSI/output detector 600 connected through a multiplexer 602 to both the output detector 94 and the open loop output line 68. Through the multiplexer 602, as controlled through a multiplexer selector control line 601, the RSSI/output detector 600 is able to, in cooperation with the CPU 24" and MSM ASIC 22''', perform the function of both the A-to-D converter 500 of FIG. 7 and the RSSI detector 552 of FIG. 9. Thus, as shown in FIG. 12, the process of the represented preferred embodiment is almost identical to that represented by FIG. 10 except for changes due to using an analog-to-digital sampling source for output power determination.

Finally, in light of the variances in open loop power, it should be understood that the term "maximum power" and similar terms used herein refer to one of a small range of total output power levels above the output power trigger level. Similarly, the scope of the present invention includes additional preferred embodiments which include multiple output power trigger levels based upon various communication modes. For example, in certain communication modes, the conventional closed loop power control step may be larger than 1.0 dB, thus the threshold amount would need to be lower to appropriately limit output power for that mode of communication.

While the embodiments of the present invention which have been disclosed herein are the preferred forms, other embodiments of the present invention will suggest themselves to persons skilled in the art in view of this disclosure. Therefore, it will be understood that variations and modifications can be effected within the spirit and scope of the invention and that the scope of the present invention should only be limited by the claims below. Furthermore, the equivalents of all means- or step-plus-function elements in the claims below are intended to include any structure, material, or acts for performing the function as specifically claimed and as would be understood by persons skilled in the art of this disclosure.

We claim: We claim:

1. An output power system for a radio communication device operable with a base station, said output power system comprising:

an adjustable transmitter amplifier; and a controller connected to said adjustable transmitter amplifier to prevent closed loop power control saturation, wherein the closed loop power control saturation that would otherwise occur without said controller would include said adjustable transmitter amplifier being unable to respond within a defined period to base station commands to reduce power.

2. The system of claim 1, wherein said controller includes an output power threshold comparator.

3. The system of claim 1, wherein said controller is configured to cause said adjustable transmitter amplifier to reduce output power below an output power threshold.

4. The system of claim 1, wherein said controller is configured to cause said adjustable transmitter amplifier to maintain output power below an output power threshold.

5. The system of claim 1, further comprising a base station closed loop power control command receiver, wherein said controller is configured to selectively prevent closed loop increase power commands received from the base station from causing an increase in output power of said adjustable transmitter amplifier.

6. The system of claim 1, further comprising an open loop automatic gain control signal generator and a closed loop gain control signal generator, wherein said controller is configured to selectively adjust said closed loop gain control signal.

7. The system of claim 1, further comprising a received signal strength detector, wherein said controller is configured to be responsive to said received signal strength detector in controlling said adjustable transmitter amplifier.

8. The system of claim 1, wherein said controller is configured to operate in a first mode while output power is below a threshold and in a second mode while output power is above a threshold, wherein operation in said second mode includes causing said adjustable transmitter amplifier to reduce output power below the threshold.

9. An output power control method for a radio communication device operable with a base station, said method comprising steps of:

transmitting communication signals through an adjustable transmitter amplifier; and controlling said adjustable transmitter amplifier to prevent closed loop power control saturation, wherein the closed loop power control saturation that would otherwise occur without said controlling would include said adjustable transmitter amplifier being unable to respond within a defined period to base station commands to reduce power.

10. The method of claim 9, wherein said controlling step includes comparing output power of said adjustable transmitter amplifier to an output power threshold.

11. The method of claim 9, wherein said controlling step includes causing said adjustable transmitter amplifier to reduce output power below an output power threshold.

12. The method of claim 9, wherein said controlling step includes causing said adjustable transmitter amplifier to maintain output power below an output power threshold.

13. The method of claim 9, further comprising a step of receiving base station closed loop power control commands, wherein said controlling step includes selectively preventing closed loop increase power commands received from the base station from causing an increase in output power of said adjustable transmitter amplifier.

14. The method of claim 9, further comprising a step of generating an open loop automatic gain control signal and a closed loop gain control signal, wherein said controlling step includes selectively adjusting said closed loop gain control signal.

15. The method of claim 9, further comprising a step of detecting received signal strength, wherein said controlling step includes being responsive to said received signal strength.

16. The method of claim 9, wherein said controlling step includes steps of operating in a first mode while output power is below a threshold and in a second mode while output power is above a threshold, wherein operation in said second mode includes causing said adjustable transmitter amplifier to reduce output power below the threshold.

17. An output power system for a radio communication device operable with a base station, said output power system comprising:

means for transmitting a communication signal with adjustable amplification; and means for controlling said transmitting means for preventing closed loop power control saturation, wherein the closed loop power control saturation that would otherwise occur without said controlling means would include said transmitting means being unable to respond within a defined period to base station commands to reduce power.

18. The system of claim 17, wherein said controlling means includes means for causing said transmitting means to maintain output power below an output power threshold.

19. The system of claim 17, further comprising means for receiving a base station closed loop power control command, wherein said controlling means includes means for selectively preventing closed loop increase power commands received from the base station from causing an increase in output power of said transmitting means.

20. The system of claim 17, further comprising means for generating an open loop automatic gain control signal and a closed loop gain control signal, wherein said controlling means includes means for selectively adjusting said closed loop gain control signal.

\* \* \* \* \*